United States Patent [19]

Perilloux et al.

[11] Patent Number: 4,896,928
[45] Date of Patent: Jan. 30, 1990

[54] CHROMATICALLY INVARIANT MULTILAYER DIELECTRIC THIN FILM COATING

[75] Inventors: Bruce E. Perilloux; Stephen D. Vincent, both of Grass Valley, Calif.

[73] Assignee: Coherent, Inc., Auburn, Calif.

[21] Appl. No.: 238,095

[22] Filed: Aug. 29, 1988

[51] Int. Cl.$^4$ ............................. G02B 5/22; G02B 5/28
[52] U.S. Cl. ....................................... 350/1.6; 350/166
[58] Field of Search .......................... 350/164, 166, 1.6

[56] References Cited

U.S. PATENT DOCUMENTS

| | | | |
|---|---|---|---|
| 3,990,784 | 11/1976 | Gelber | 350/166 |
| 4,045,125 | 8/1977 | Farges | 350/166 |
| 4,047,805 | 9/1977 | Sekimura | 350/166 |
| 4,229,666 | 10/1980 | Rancourt et al. | 350/1.6 |
| 4,536,063 | 8/1985 | Southwell | 350/164 |
| 4,793,669 | 12/1988 | Perilloux | 350/166 |

OTHER PUBLICATIONS

Baumeister; "Design of Multilayer Filters by Successive Approximations"; Journal of the Optical Society of America, vol. 48, No. 12; Dec. 1958; pp. 955–958.
"Optical Coating Design with Reduced Electric Field Intensity", Joseph H. Apfel, Applied Optics, vol. 16, No. 7, Jul. 1977 (pp. 1880–1885).
"Electric Field Distribution and the Reduction of Laser Damage in Multilayers", O. Arnon and P. Baumeister, Applied Optics, vol. 19, No. 11, Jun. 1980.
"Nonpolarizing Edge Filters", Alfred Thelen, J. of the Optical Society of America, vol. 71, No. 3, Mar. 1981 (pp. 309–314).
"The Transmission and Degree of Polarization of Quarter–Waves Stacks at Non–Normal Incidence", Philip Baumeister, Optica Acta, vol. 8, No. 2, Apr. 1961 (pp. 105–119).
"Optical Interference Coating Technology", Lecture Notes of Philip Baumeister, pp. 2–92, 2–93, and 6–48 thru 6–51 (Dec. 1985).

Primary Examiner—Bruce Y. Arnold
Assistant Examiner—Terry S. Callaghan

[57] ABSTRACT

A short-wave-pass optical filter, including a partially absorbing or transparent substrate coated by a set of layers having different quarter-wave optical thicknesses, which is designed to reflect visible radiation of a selected color white transmitting visible radiation and maintaining a neutral color balance. The inventive filter is designed so that the desired reflected color (and the transmitted neutral color balance) is substantially independent of viewing angle (i.e., the incidence angle). In a preferred embodiment, the substrate is composed of UV-absorbing glass, and the coating is substantially a double quarter-wave stack of alternating layers of $SiO_2$ and $TiO_2$, TiO or $Ti_2O_3$. The reflectance of the inventive filter (as a function of wavelength) is designed to have a ripple in at least one segment of the visible spectrum, but to have no significant ripples in all other segments of the visible spectrum. The partial reflection represented by the one or more rippled regions is sufficient to give the filter a desired aesthetic color, such as violet, orange, or blue. In a preferred embodiment, the visible light reflected by the inventive filter corresponds not only to a first rippled region, but also to a second rippled region or "partial second-order stopband" (or both), where each rippled region and partial second-order stopband is positioned so that, as the reflected light is viewed with changing incidence angle, the reflected color will not significantly change.

33 Claims, 9 Drawing Sheets

CHROMATICALLY INVARIANT MULTILAYER DIELECTRIC THIN FILM COATING

FIELD OF THE INVENTION

This invention relates to short-wave-pass optical filter coatings, and to methods for designing such coatings. More particularly, the invention relates to short-wave-pass optical filters that reflect light in one or more selected wavelength segments of the visible spectrum, but transmit visible wavelengths with neutral color balance, and to methods for designing such filters.

BACKGROUND OF THE INVENTION

Although the discussion in this specification applies to all optical filters (including any lens, mirror, and any other optical filter), such discussion will sometimes include specific references to the lenses of sunglasses for simplicity. Sunglass lenses are an important embodiment of the inventive optical filter, though by no means is such embodiment the only one contemplated by the inventor.

The common gray, green or brown tinted sunglass is usually a colored glass that absorbs a significant amount of radiation in both the visible and ultra-violet spectra. Tinted glass that has near neutral visible radiation transmission qualities and also totally absorbs ultra-violet or infrared radiation (or both ultra-violet and infrared radiation) is not readily available.

It is well known that clear glass (e.g. BK-7) will transmit the entire visible spectrum, and that a coating may be applied to clear glass in order to reflect certain wavelengths of light. Any wavelength which is completely reflected from such coated glass will not be transmitted. Therefore, these wavelengths will be taken out of the color spectrum when viewing natural objects through the glass.

It is also known that two quarter-wave stacks, where all layers comprising each stack have substantially the same quarter-wave optical thickness, deposited upon a transparent substrate, may be used as a short-wave-pass (SWP) filter. It is conventional to adjust the optical thickness of each stack so that the visible wavelengths (400 nm to 680 nm) will not reflect and the near-infrared (NIR) wavelengths (700 nm to 1100 nm) will totally reflect from the coated substrate. It is also known that a substrate (commonly glass) that absorbs a percentage of the visible wavelengths and all ultra-violet radiation may be employed as a sunglass, and could be coated by a quarter-wave stack of the above-described type. This sunglass will transmit no UV solar radiation and reflect most NIR solar radiation and will allow only a percentage of the total visible spectrum's energy to pass through to the eye.

It is conventional that the double quarter-wave stack may have more than 25 layers whose thickness is optimized so that a very small part of one (or both) of the colors blue and red (on the edges of the visible spectrum) are reflected for aesthetic purposes. Revo ® sunglasses (commercially available through Revo, Inc.), are an example of eyeglasses having such a multi-layer coating. By reflecting only a small amount of the visible radiation, and only reflecting visible radiation in the wavelength regions where the human eye is least sensitive (in the blue and red), a relatively correct color balance is maintained in transmission. This color balance and the observed reflected aesthetic color can be computed numerically and plotted on a C.I.E. 1931 Chromaticity Diagram. Since the glass conventionally used absorbs more blue than red and yellow light, the transmitted color balance tends to be slightly yellow.

If the described multilayer coating were scratched, a visual defect would be observed due to the multilayer interference. However, a thick top layer of fused silica is conventionally used to make most scratches unobservable.

Although such conventional lenses are designed to have desirable optical properties, they are very difficult and expensive to manufacture. Specifically, the design of the prior art lenses require that the coatings must be applied with great accuracy. However, deviations in the manufacturing process commonly cause the reflected wavelengths to vary. If the variation is such that the reflected range is out of the visible region (a common occurrence), the lens will not be properly colored in reflection. If the shift moves the reflected range further into the visible region (another common occurrence), too much visible radiation will be reflected and the transmitted color balance will be lost. This latter result is particulary a problem if red light is reflected so that the wearer might not be able to detect a red traffic light.

Also, since the substrate of this type of prior art lens has a curved surface, a green ring is typically observable (when reflecting red light) near the edge of the lens because the coating's spectral curve shifts toward shorter wavelengths with increasing incidence angle, or coating runoff as the coating is deposited.

More simplistic coating designs are utilized on other commercially available sunglasses. These simple designs typically use basic one to ten layer broad band anti-reflection (AR) coatings. These coatings reflect some part of the visible spectrum for aesthetic purposes. However, they do not simultaneously preserve neutral transmitted color balance and block substantially all near-infrared (NIR) light. If one were to integrate to find the area under the reflectance spectrum of one of these filters (over the visible wavelength band) the total area would be more than one would obtain if one performed similar integration of a reflectance curve characterizing the inventive filter. The quality of the transmitted color balance is accordingly degraded in the conventional coating design. Although the manufacturing complexity of this simple conventional coating design, and the cost to manufacture filters embodying such design, is relatively low, the optical performance of filters embodying such simple coating design is compromised.

The variation of reflected color with viewing angle is another characteristic common to conventional single dielectric and multilayer sunglass coatings (and other multilayer optical filters) that are designed to reflect visible electromagnetic radiation for aesthetic purposes. For example, the above-described Revo ® multilayer coated sunglasses will appear to change in color as a viewer observes them in reflected light from a changing view angle. This chromatic phenomenon occurs generally, except in the special case that the coated sunglasses are designed to reflect only violet light having wavelength less than 470 nm.

It is well known as a matter of optical theory that a multilayer filter's reflectance spectrum (and other characteristics of such a filter) is dependent upon incidence angle, and that this dependence can be affected by changing the thickness of the high and low refractive index layers of the filter. Although this phenomenon is well understood in an abstract sense, until the present invention has not been suggested that the phenomenon could be applied to reduce reflected color variation in quarter wave stack filters, nor in quarter wave stack SWP filters.

It has not been known until the present invention how repeatably and economically manufacturable optical filters (including sunglasses), having a selected aesthetic reflected color and a neutral transmitted color balance, may be designed so that the aesthetic reflected color (and the neutral transmitted color balance) is substantially independent of incidence angle.

SUMMARY OF THE INVENTION

The inventive optical filter is a short-wave-pass (SWP) filter deposited upon a substrate where the multilayer coating is designed to reflect near-infrared wavelengths, and to partially reflect a desired color in the visible spectrum while also maintaining neutral transmitted color. The inventive filter is designed so that the desired reflected color (and the transmitted neutral color balance) is substantially independent of the viewing angle (i.e., the incidence angle). In a preferred embodiment, the substrate is composed of UV-absorbing filter glass, and the coating is a double quarter-wave stack of alternating layers of $SiO_2$ and $TiO_2$, TiO or $Ti_2O_3$. Preferably the thickness of each layer is optimized (each layer thickness may be different) using a merit function to produce the desired optical properties in a manufacturable and reproducible design.

The reflectance of the inventive filter (as a function of wavelength) is designed to have a ripple in at least one segment of the visible spectrum, but to have no significant ripples in all other segments of the visible spectrum. The partial reflection represented by the one or more rippled regions is sufficient to give the filter a desired aesthetic color, such as violet, orange, or blue. Since not all the light in each rippled segment is completely reflected, the transmitted light will have a neutral color balance, so that an observer viewing the transmitted light will perceive true real-world colors.

In a preferred embodiment, the visible light reflected by the inventive filter corresponds not only to a first rippled region, but also to a second rippled region or "partial second-order stopband region" (or both). We have recognized that the frequency ranges corresponding to such rippled regions and partial second-order stopband region are inherently dependent on angle of incidence. In accordance with the invention, each rippled region and partial second-order stopband region is positioned so that, as the reflected light is viewed with changing incidence angle, the reflected color will not significantly change (because the second rippled region, or partial second-order stopband region, will shift into the frequency range formerly occupied by the first rippled region).

The invention also includes the method of designing each embodiment of the inventive filter.

DETAILED DESCRIPTION OF THE PREFERRED EMBODIMENTS

Figure 1:
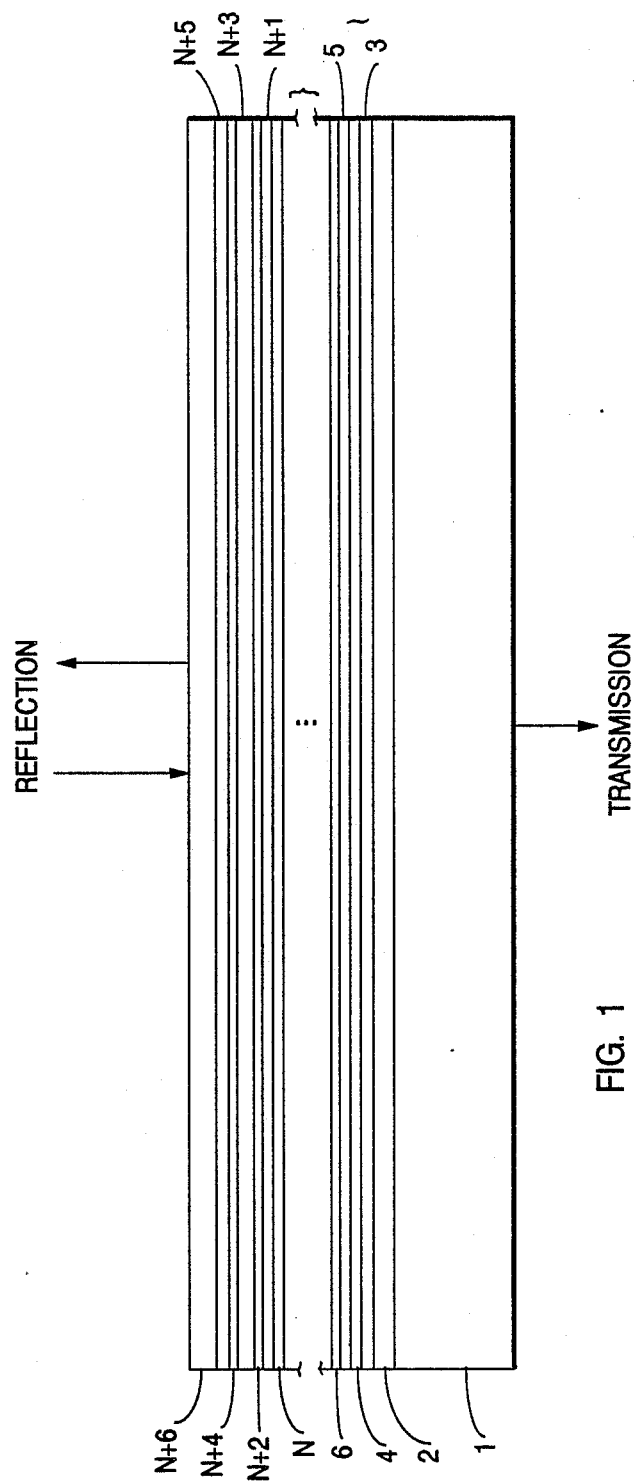
FIG. 1 is a cross-sectional view of an optical filter of the type that may embody the invention. Substrate 1 supports N+5 coating layers (identified by numerals 2,3, ..., N+6).

FIG. 1 is an enlarged cross-sectional view of an SWP filter of the type that may embody the invention. Substrate 1 is preferably an optical filter glass, preferably of the type that absorbs UV radiation (radiation having wavelength less than 400 nm) and transmits approx. 25% of all visible light. UV-absorbing glass of any conventional type is suitable for use as substrate 1 in many applications, such as applications in which the filter is used as a sunglass lens. In particular, TAN-C Crown Glass (manufactured by Schott Glass Technologies, Inc.) is a preferred UV-absorbing filter glass.

It should be appreciated, however, that the substrate on which the inventive coating is applied need not be absorptive of UV and partially absorptive of visible light. Alternatively, it could be transparent to either UV, or visible light, or to both. Also, where it is desired to use a non-absorptive substrate, a single thin-film layer of absorbing material may be coated on transparent glass to achieve the desired optical properties of the substrate.

A number of quarter-wave layers (having reference numerals 2 through N+6) are successively coated on the surface of substrate 1, so that layers formed of material having low refractive index alternate with layers formed of material having high refractive index. The number of quarter-wave layers (each having optical thickness substantially equal to a desired quarter-wavelength) coated on the substrate will depend on the desired optical properties of the filter. The invention in its broadest scope is not limited to a class of filters having any specific number of layers. There may be an even number or odd number of layers. The layer immediately adjacent the substrate (layer 2 in FIG. 1) may be a member of the subset having high refractive index or may be a member of the subset having low refractive index. In one illustrative embodiment of the invention substrate 1 is glass having index of refraction equal to 1.52, the even layers (2, 4, 6 and so on) are composed of silicon dioxide (having an approximate index of refraction 1.44) and the odd layers (3, 5, 7 and so on) are composed of titanium dioxide (having an approximate index of refraction 2.25). Alternatively, the even-numbered coatings may be composed of titanium dioxide (having refractive index of 2.25) and the odd-numbered coatings may be composed of silicon dioxide (having refractive index of 1.44). It should be noted that other oxide compounds could be substituted for these materials (i.e., TiO or $TiO_2O_3$ may be substituted for $TiO_2$).

The layers in each subset need not all have identical refractive index, or optical thickness equal to one quarter wavelength of a single selected electromagnetic wave. The refractive index and thickness of each layer is selected in a manner to be described below so that the filter has a reflectance spectrum having the following properties: a ripple over at least a first segment (or "region") of the visible spectrum, but no significant ripple over a second segment of the visible spectrum; and a partial second-order stopband region located so as to reduce the variation of the reflected visible light's color with incidence angle and so that the neutral color balance of the transmitted visible light is substantially independent of incidence angle.

The terms "segment" and "region" will be used interchangeably throughout this Specification, including in the claims, to denote any continuous wavelength range of the electromagnetic spectrum spanned by two distinct wavelengths, and to denote several of such ranges. Throughout this Specification, including the claims, the term "ripple" (or "rippled region", or the like) will be used to describe a portion of a reflectance spectrum (such as the spectrum of FIG. 2, 3, or 4) that includes peaks and troughs with sufficiently large peaks (a large peak represents a large reflectance) so that an observer of reflected light from the filter having wavelength within the rippled region will observe a desired reflected color, but an observer of visible light transmitted from a real-world object through the filter will perceive true real-world colors. Thus, transmitted light having wavelengths in the non-rippled portion of the visible range, together with transmitted light having wavelengths corresponding to the rippled region, will be perceived as having a neutral color balance. Regions in the visible reflectance spectrum that include ripples of sufficiently low amplitude do not contribute significantly to producing a desired aesthetic color to an observer viewing the filter. These regions will not be referred to as exhibiting a "significant ripple" or "a ripple" (or the like), and instead will be denoted as "non-rippled" regions (or the like).

Figure 2:
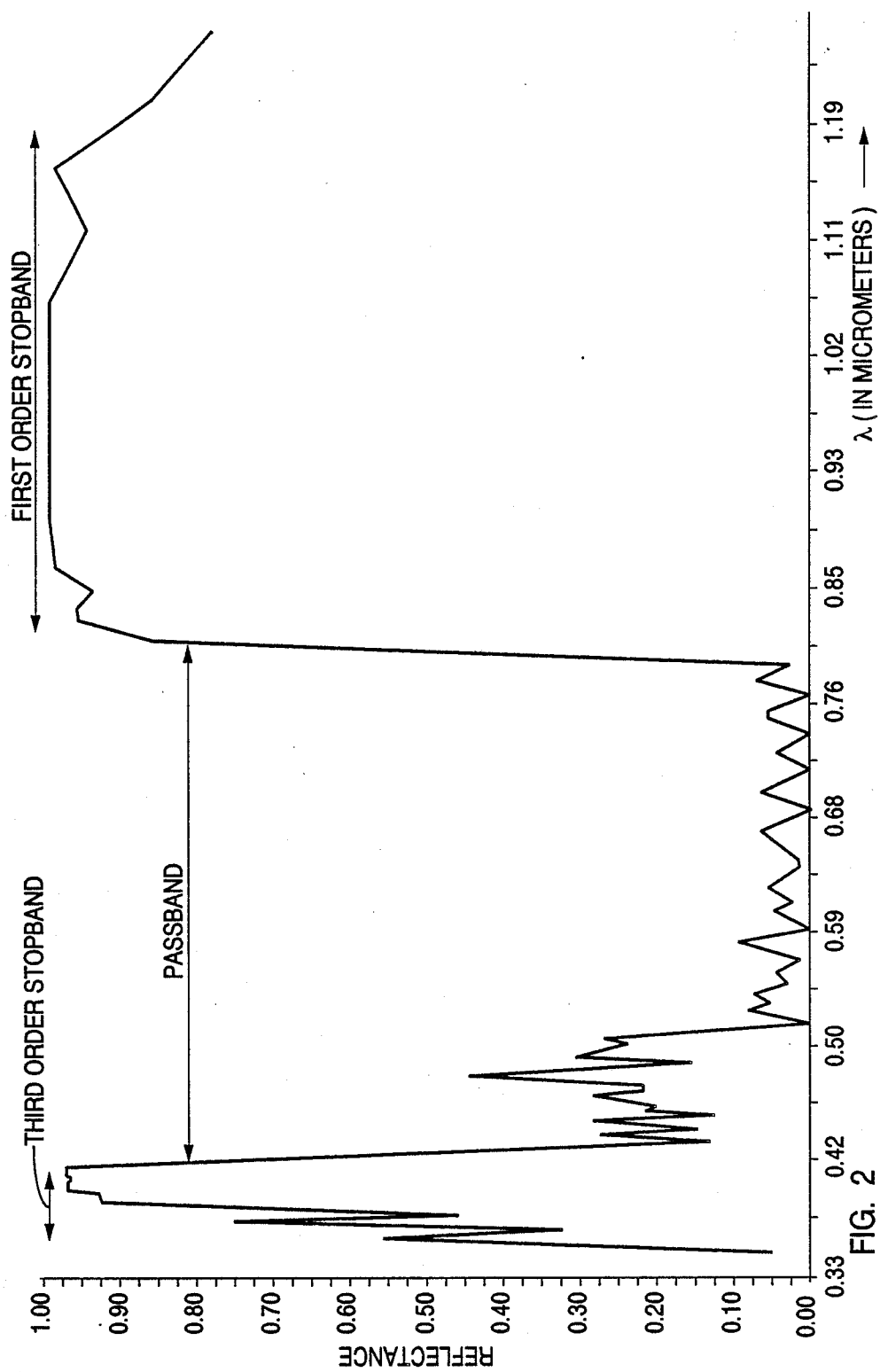
FIG. 2 is a graph showing the reflectance characteristics of a SWP (Short Wave Pass) filter, which does not embody the invention of the present application, but which reflects light having a blue appearance. Distance above the horizontal axis represents reflectance. Horizontal distance away from the vertical axis represents wavelength in units of micrometers.

The general optical properties of the inventive filter may be readily understood in comparison and contrast with the properties of the optical filter characterized by FIG. 2. FIG. 2 is the reflectance curve characterizing an optical filter which does not embody the invention of the present application, but which reflects light having a blue appearance. This filter reflects substantially all (i.e. more than approximately 93 percent) near-infrared electromagnetic radiation in the segment of the spectrum above the wavelength 790 nm, and transmits substantially all light in the range from 505 nm to 700 nm.

There is no ripple of significant amplitude in such 505-700 nm range. The reflectance curve does exhibit a ripple in the blue region from about 450 nm to about 505 nm. The FIG. 2 filter is designed so that its transmitted color balance is neutral. The eye of a viewer observing light transmitted through the FIG. 2 filter will not be very sensitive to the reflected components having low amplitude (the wavelength components corresponding to the ripple).

The FIG. 2 filter includes a glass substrate having refractive index 1.52 and total transmission (as a function of wavelength) as listed in Table 1, and twenty-nine alternating layers of $SiO_2$ (with refractive index 1.44), and $TiO_2$ (with refractive index 2.25) supported by the substrate's surface.

TABLE 1

| Wavelength (nanometers) | Total Transmission |
|---|---|
| 360 | 1.0E-6 |
| 400 | .0225 |
| 440 | .03 |
| 480 | .061 |
| 520 | .100 |
| 560 | .167 |
| 600 | .206 |
| 640 | .225 |
| 680 | .241 |
| 700 | .24 |
| 740 | .188 |
| 780 | .136 |

The total transmission is indicative of the amount of absorption in the substrate as a function of wavelength. The physical thickness and refractive index of each layer supported by the substrate is listed in Table 2:

TABLE 2

| Layer Number | Refractive Index | Physical Thickness (micrometers) |
|---|---|---|
| 1 | 1.44 | .0122 |
| 2 | 2.25 | .1134 |
| 3 | 1.44 | .1757 |
| 4 | 2.25 | .1089 |
| 5 | 1.44 | .1531 |
| 6 | 2.25 | .1047 |
| 7 | 1.44 | .1623 |
| 8 | 2.25 | .1024 |
| 9 | 1.44 | .1590 |
| 10 | 2.25 | .1044 |
| 11 | 1.44 | .1545 |
| 12 | 2.25 | .1073 |
| 13 | 1.44 | .1544 |
| 14 | 2.25 | .1086 |
| 15 | 1.44 | .1590 |
| 16 | 2.25 | .1103 |
| 17 | 1.44 | .1691 |
| 18 | 2.25 | .1210 |
| 19 | 1.44 | .1899 |
| 20 | 2.25 | .1249 |
| 21 | 1.44 | .2018 |
| 22 | 2.25 | .1177 |
| 23 | 1.44 | .2048 |
| 24 | 2.25 | .1299 |
| 25 | 1.44 | .1930 |
| 26 | 2.25 | .1146 |
| 27 | 1.44 | .1931 |
| 28 | 2.25 | .1124 |
| 29 | 1.44 | .3161 |

The layer immediately adjacent the substrate is identified as layer number 1, and the layer farthest from the substrate is identified as layer number 29. Layer 29 is intentionally much thicker than the other $SiO_2$ layers, so that it will be scratch insensitive, in the sense that minor scratches in layer 29 will not be apparent to a viewer of reflected or transmitted light. The twenty-nine layers comprise a double quarter-wave coating stack, with optimized layer thickness.

The highly reflective region of the FIG. 2 filter above about 790 nm is denoted the "first order stopband." A second order stopband would occur at twice the frequency (half the wavelength) of the first order stopband, if it were present, but is missing in the FIG. 2 filter, since the FIG. 2 filter's alternating high refractive index and low refractive index layers have approximately equal optical thickness. The highly reflective region from about 340 nm to 420 nm in FIG. 2 is the third order stopband (occurring at three times the frequency of the first order stopband).

Figure 3:
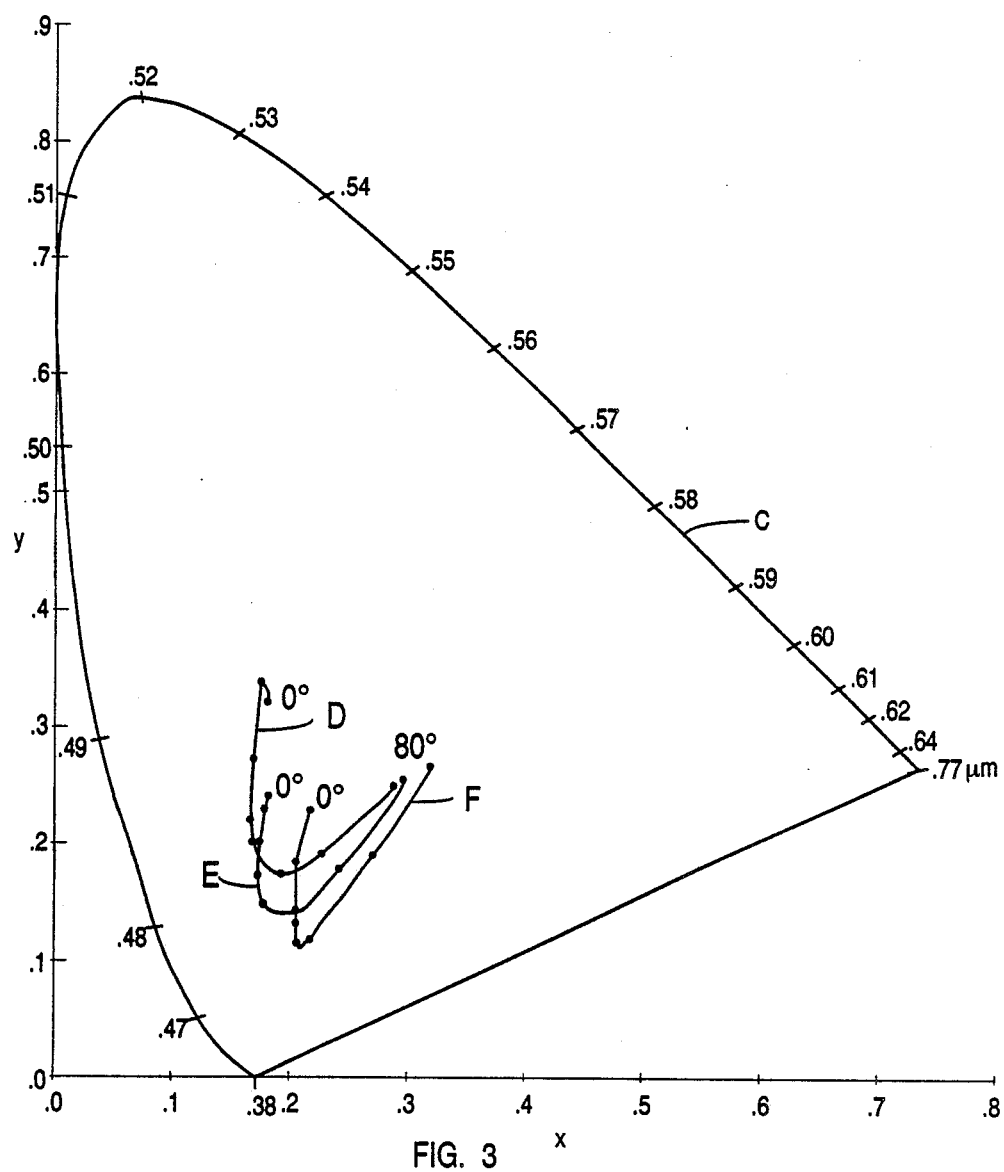
FIG. 3 is a C.I.E. 1931 Chromaticity Diagram showing the reflection chromaticity of the FIG. 2 filter (and two modified versions thereof) as a function of incidence angle over the range from zero to eighty degrees.

However, the reflection chromaticity of the FIG. 2 filter varies substantially as a function of incidence angle, as is apparent from FIG. 3. FIG. 3 is a C.I.E. 1931 Chromaticity diagram, so that the X primary is plotted on the horizontal axis, the Y primary is plotted on the vertical axis, and the Z primary is uniquely determined as $Z = 1 - X - Y$. The numerals on curve C (the perimeter curve) correspond to dominant wavelengths in micrometers. Each data point on curve E of FIG. 3 represents the reflection chromaticity of the FIG. 2 filter at an incidence angle in the set comprising 0°, 20°, 30°, 40°, 50°, 60°, 70°, and 80°. It is apparent from curve E that the reflected color changes from greenish-blue, to blue, and then to violet, as the filter is "tilted" while viewed in reflected light to cause the incidence angle to change from zero degrees to 80 degrees.

Curve D in FIG. 3 represents the reflection chromaticity of a modified version of the FIG. 2 filter in which the thickness of each high refractive index layer is increased by five percent. Curve F in FIG. 3 represents the reflection chromaticity of a modified version the FIG. 2 filter in which the thickness of each high refractive index layer ("H" layer) is decreased by five percent. Comparison of curves E and F shows that reducing the thickness of each H layer in the curve E filter design, will moderately improve (i.e., reduce) the reflected color variation with incidence angle.

A first preferred embodiment of the invention will next be described with reference to FIG. 4. The FIG. 4 embodiment is an SWP filter, comprising a double stack of substantially quarter wave layers, designed to reflect light having a blue appearance. This filter is characterized by the reflectance curve shown in FIG. 4. The FIG. 4 filter reflects substantially all NIR radiation, and transmits substantially all visible radiation in the 580 nm–780 nm band. Although the reflectance in the 580–780 nm band is not perfectly flat (near zero), it exhibits no rippling of significant amplitude in that range. The FIG. 4 curve does exhibit a ripple in the violet-blue wavelength region (420 nm–500 nm) and a slight (low amplitude) ripple in the green region (510 nm–560 nm). Thus, light reflected from the filter will be a combination of violet-blue and green (minimal) components and will have a blue appearance. The amount of light reflected in the rippled regions is so small, however, that the transmitted color balance will be substantially neutral.

Figure 4:
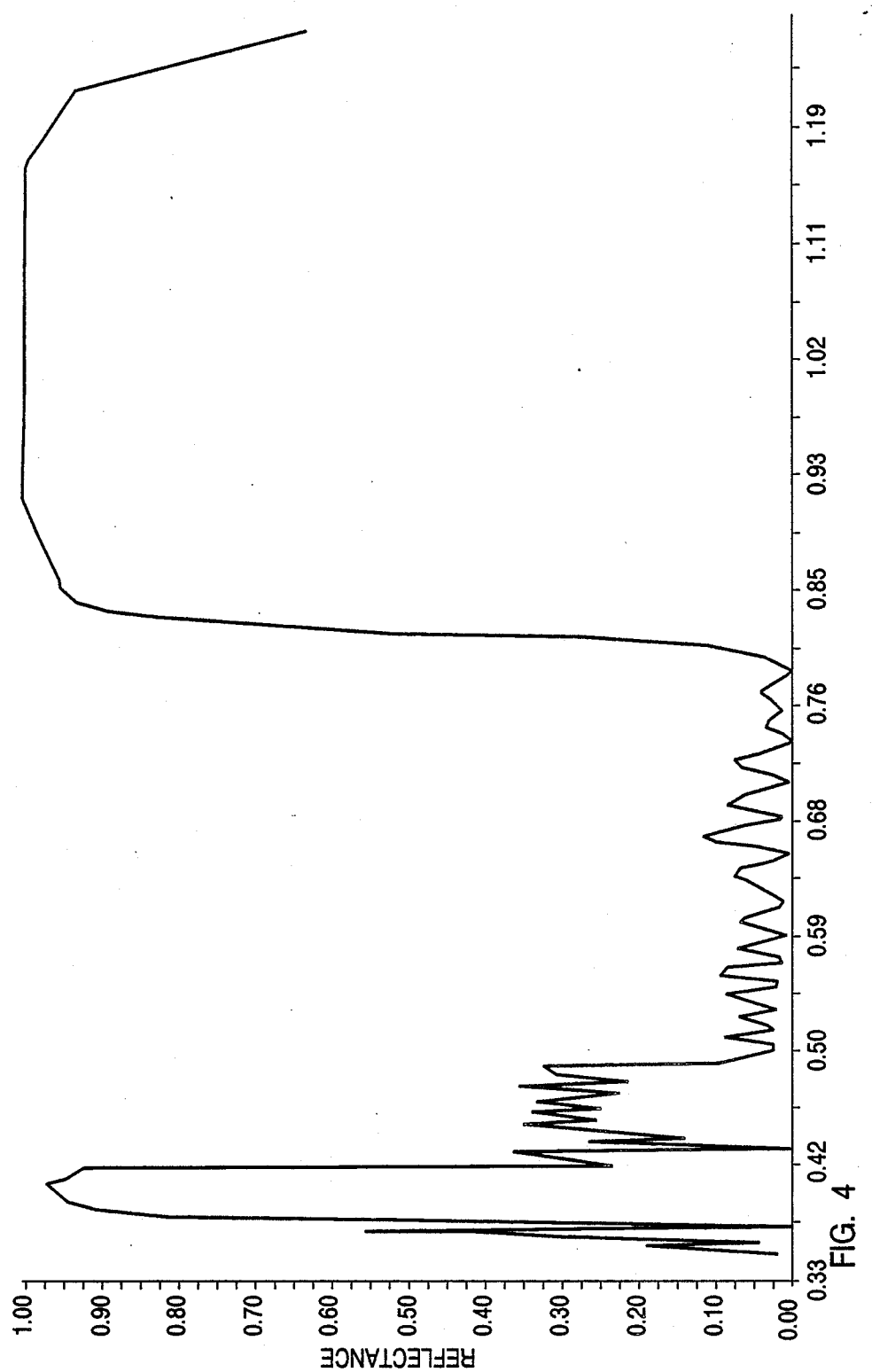
FIG. 4 is a graph (having the same axes as FIG. 2) showing the reflectance characteristics of a preferred embodiment of the inventive filter that reflects light having a blue appearance.
Figure 5:
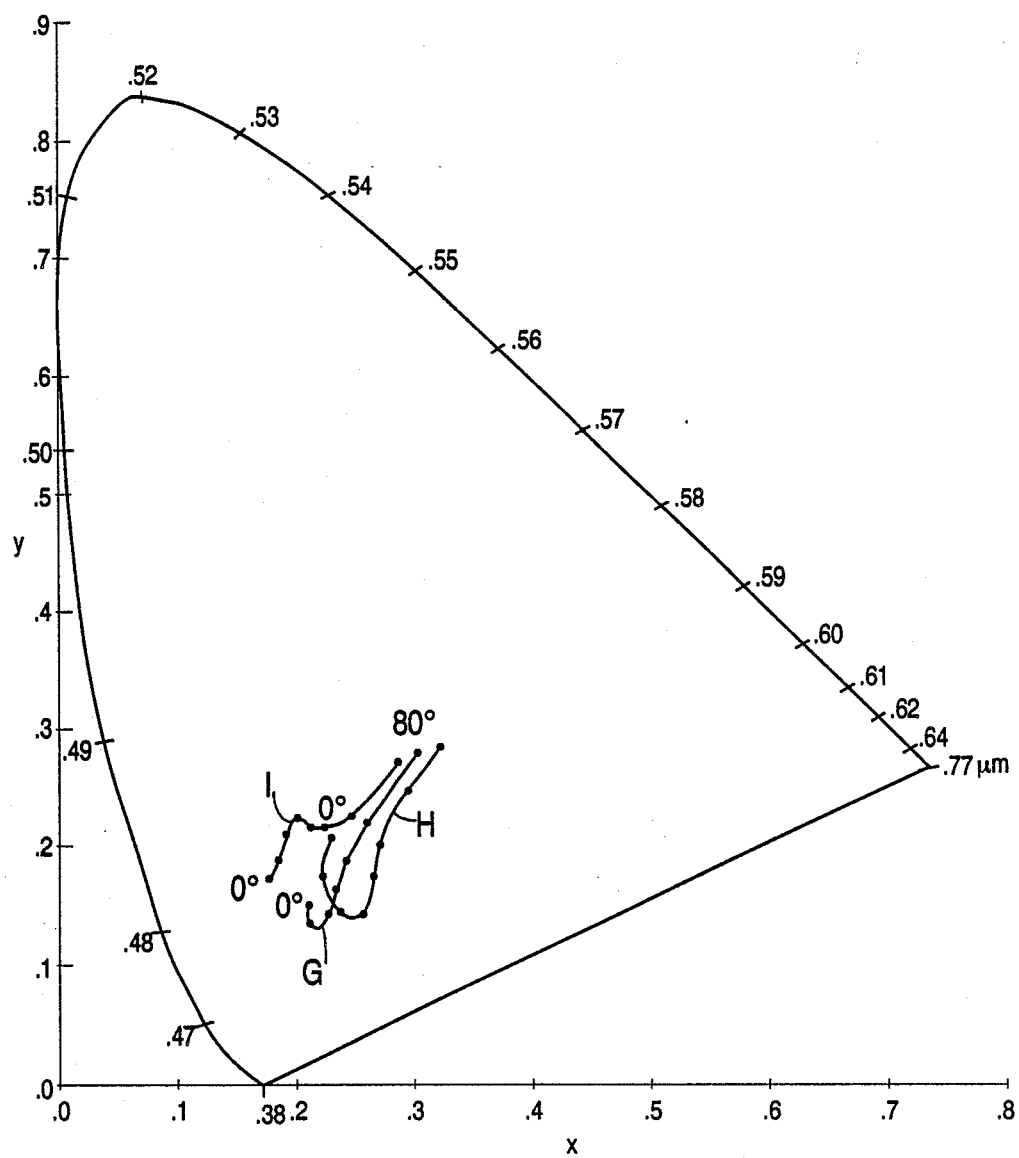
FIG. 5 is a reflection chromaticity plot showing the reflection chromaticity of the FIG. 4 filter (and two modified versions thereof) as a function of incidence angle over the range from zero to eighty degrees.

FIG. 5 is another C.I.E. 1931 Chromaticity diagram. Each data point on curve G of FIG. 5 is the reflection chromaticity of the inventive FIG. 4 filter at a particular incidence angle. Because an arbitrary line starting at the central neutral point, $X=0.333$, $Y=0.333$, on the chromaticity diagram represents a single dominant color, it is apparent that curve G represents a nearly straight path from an intense blue to a less intense blue. Thus visible light reflected from the FIG. 4 filter is substantially color invariant as the filter is "tilted" to cause the incidence angle to change from zero degrees to eighty degrees. For angles of incidence greater that 70 to 80 degrees, there is no dominant reflected color.

Curve I in FIG. 5 represents the reflection chromaticity of a modified version of the FIG. 4 filter in which the thickness of each high refractive index layer is increased by five percent. Curve H in FIG. 5 represents the reflection chromaticity of a modified version the FIG. 4 filter in which the thickness of each high refractive index layer ("H" layer) is decreased by five percent. The designs represented by curves H and I are clearly inferior to the FIG. 4 design (represented by curve G) in the sense that they exhibit greater reflected color variation with incidence angle than does the FIG. 4 design.

A second preferred embodiment of the invention will next be described with reference to FIG. 6. Like the FIG. 4 filter, the FIG. 6 filter is an SWP filter designed to reflect light having a blue appearance. The FIG. 6 design is substantially the same as the FIG. 4 design, except in that it includes a partial second-order stopband (identified by reference character S) at about 560 nm. Such partial second-order stopband is induced by detuning or decreasing the thickness of the high refractive index layers ("H" layers) of the top quarter wave stack of the FIG. 4 design by five percent, and decreasing the thickness of the H layers of the bottom quarter wave stack of the FIG. 4 design by three percent. We contemplate that in variations on the FIG. 6 design, the partial second-order stopband may be centered at any point in the range 520–580 nm, with a rippled region occurring in the range 420–500 nm. The amount of light reflected in the rippled regions and the partial second-order stopband of the FIG. 6 filter is sufficiently small (or occurs in the wavelength range below 450 nm, in which the human eye is relatively insensitive) so that the transmitted color balance will be substantially neutral.

Figure 6:
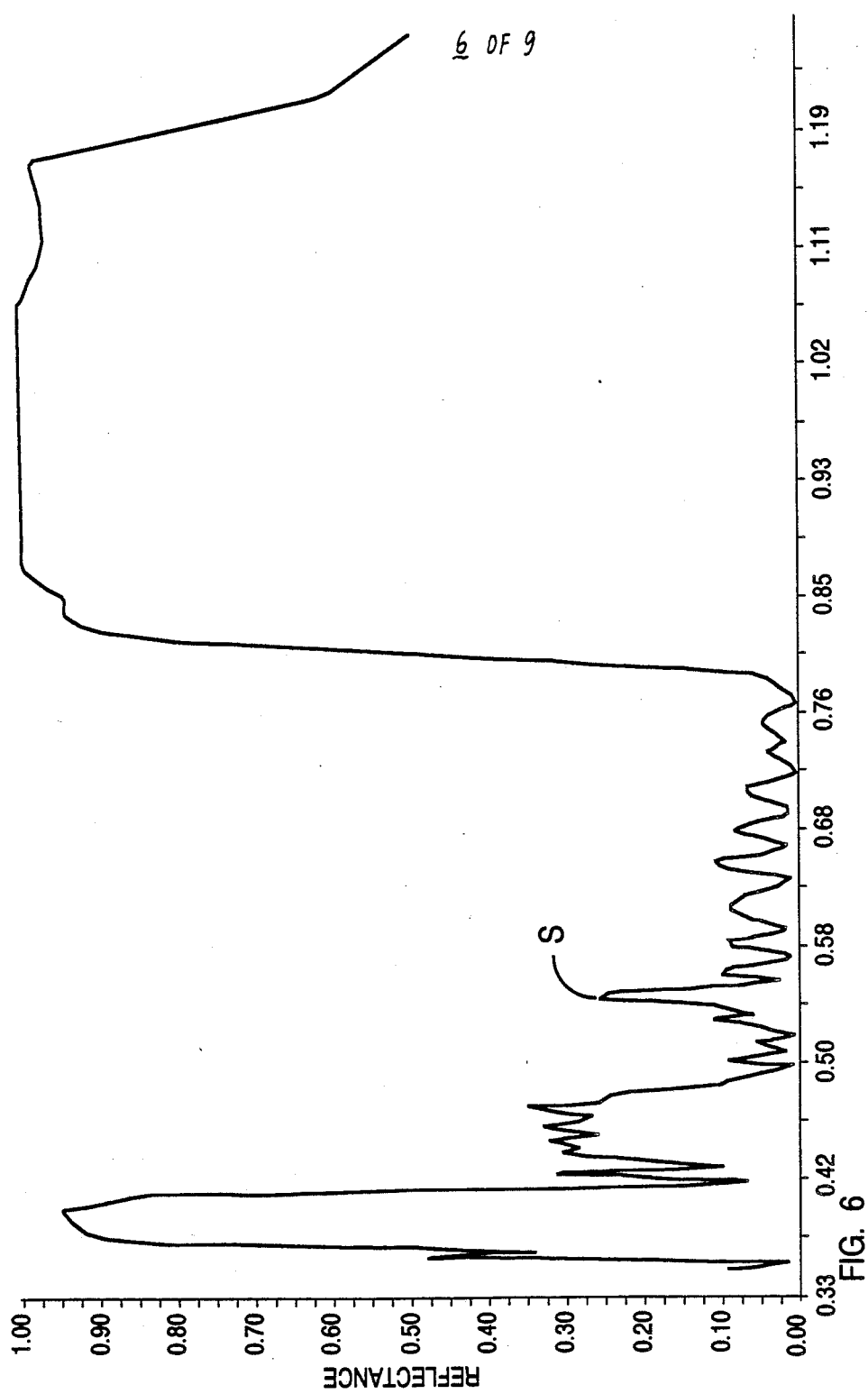
FIG. 6 is a graph (having the same axes as FIG. 2) showing the reflectance characteristics of another preferred embodiment of the inventive filter that reflects light having a blue appearance.

The FIG. 6 filter includes a glass substrate (with refractive index 1.52 and total transmission as listed in Table 1) and thirty-one layers of $SiO_2$ (with refractive index 1.44) and $TiO_2$ (with refractive index 2.25) supported by the substrate's surface. The physical thickness and refractive index of each layer is listed in Table 3:

TABLE 3

| Layer Number | Refractive Index | Physical Thickness (micrometers) |
|---|---|---|
| 1 | 1.44 | .0122 |
| 2 | 2.25 | .1115 |
| 3 | 1.44 | .1856 |
| 4 | 2.25 | .1055 |
| 5 | 1.44 | .1653 |
| 6 | 2.25 | .1055 |
| 7 | 1.44 | .1685 |
| 8 | 2.25 | .1008 |
| 9 | 1.44 | .1659 |
| 10 | 2.25 | .1021 |
| 11 | 1.44 | .1678 |
| 12 | 2.25 | .1018 |
| 13 | 1.44 | .1657 |
| 14 | 2.25 | .1045 |
| 15 | 1.44 | .1693 |
| 16 | 2.25 | .1083 |
| 17 | 1.44 | .1791 |
| 18 | 2.25 | .1176 |
| 19 | 1.44 | .1908 |
| 20 | 2.25 | .1182 |
| 21 | 1.44 | .1985 |

TABLE 3-continued

| Layer Number | Refractive Index | Physical Thickness (micrometers) |
|---|---|---|
| 22 | 2.25 | .1167 |
| 23 | 1.44 | .1899 |
| 24 | 2.25 | .1225 |
| 25 | 1.44 | .1884 |
| 26 | 2.25 | .1220 |
| 27 | 1.44 | .2048 |
| 28 | 2.25 | .1081 |
| 29 | 1.44 | .1898 |
| 30 | 2.25 | .1310 |
| 31 | 1.44 | .3282 |

The layers are numbered in order of increasing distance from the substrate so that layer number 1 is the layer immediately adjacent to the substrate and layer number 31 is the outermost, scratch insensitive layer.

Figure 7:
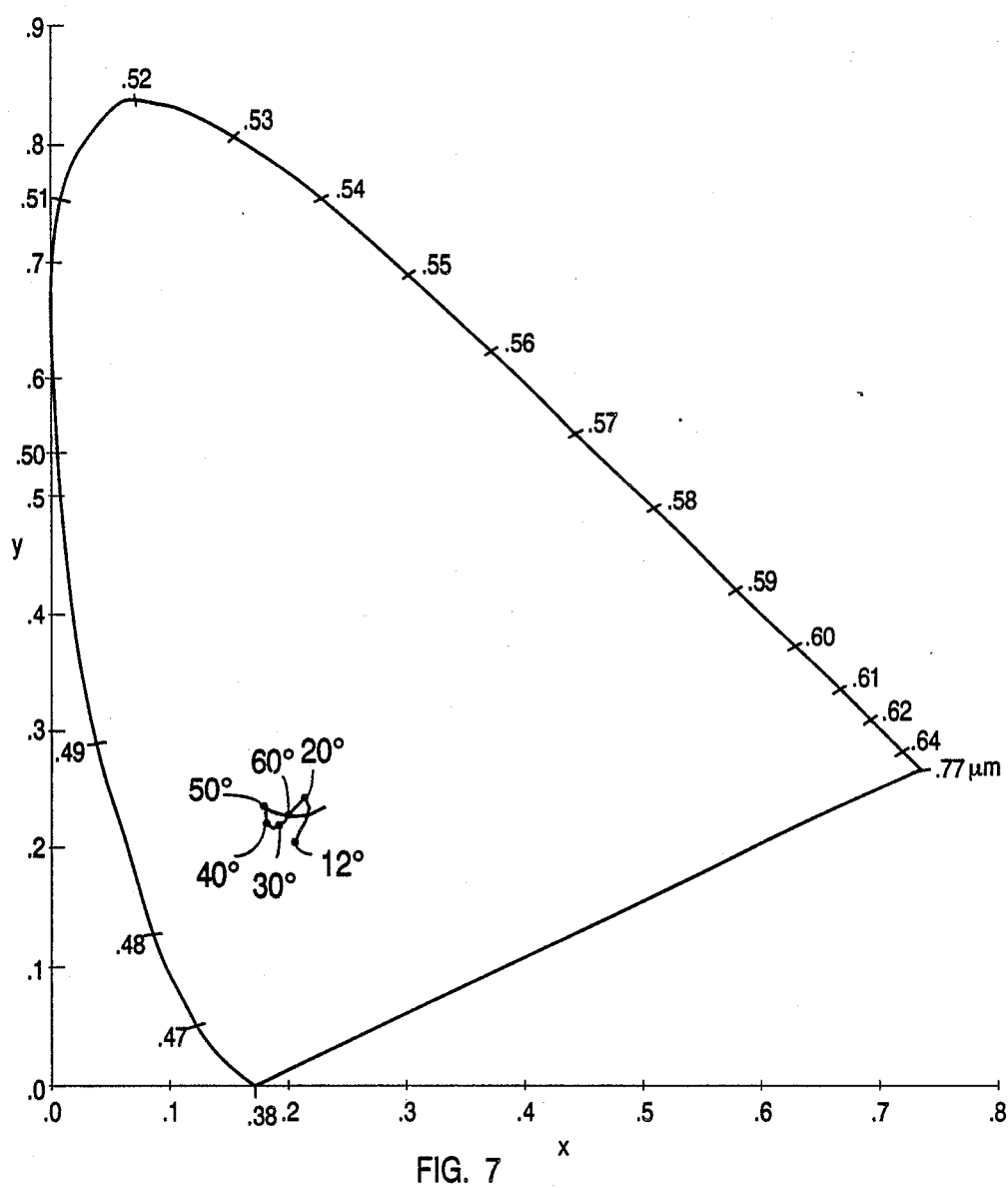
FIG. 7 is a reflection chromaticity plot showing the measured reflection chromaticity of a filter with the FIG. 6 design as a function of incidence angle.

FIG. 7 is a C.I.E. 1931 Chromaticity diagram showing reflection chromaticity as a function of incidence angle (in the range from 20 degrees to more than 60 degrees) of the thirty-one layer coating of Table 3 supported by a clear glass substrate. It is apparent that blue visible light reflected from this filter is substantially color invariant as the filter is "tilted" to cause the incidence angle to change from twelve degrees to over sixty degrees. This phenomenon occurs because with increasing incidence angle, the partial second-order stopband will shift into the range (420–500 nm) previously occupied by the rippled region at zero incidence angle.

The inventive design technique thus includes the steps of varying the relative thickness of the H layers and low refractive index layers ("L" layers) in a quarter wave stack (or double quarter wave stack, or multiple quarter wave stack) to reduce reflected color variation with incidence angle. Preferably, the reflected color variation is reduced sufficiently so that the dominant reflected color is substantially independent of incidence angle. The thickness of each H layer in either (or both) quarter wave stacks may be simultaneously increased (or decreased) by the same percentage relative to the correct L layer thicknesses in the stack.

The invention applies equally well to the design of filters for reflecting visible radiation having any color (i.e., blue, orange, or violet). For example, it is within the scope of the invention to produce variations on the FIG. 4 and 6 designs which reflect orange light, and variations on the FIG. 4 and 6 designs which reflect violet light.

Figure 8:
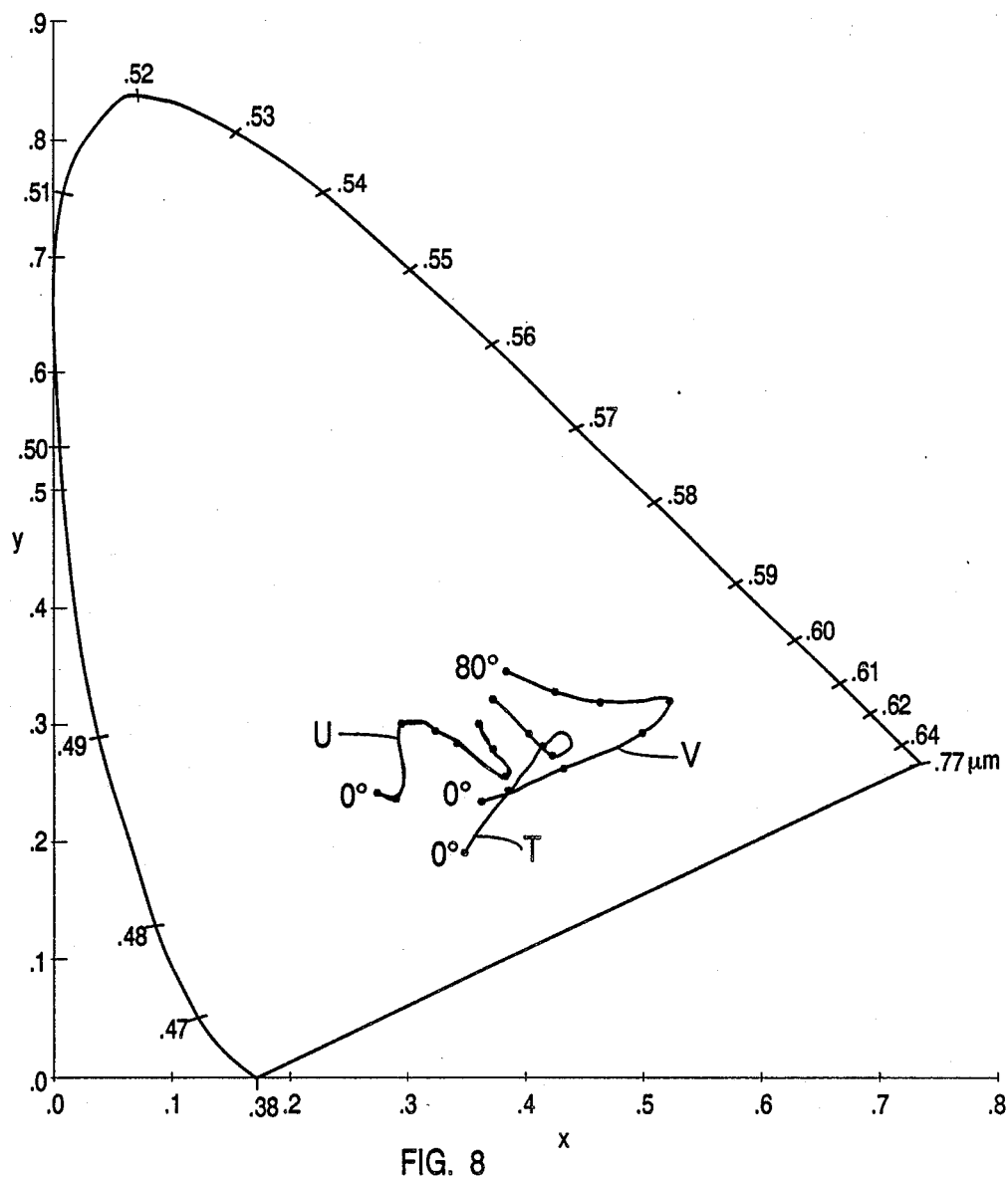
FIG. 8 is a reflection chromaticity plot showing the chromaticity of an inventive filter for reflecting violet light (and two variations on such filter), as a function of incidence angle over the range from zero to eighty degrees.

For example, FIG. 8 is a C.I.E. 1931 Chromaticity diagram showing the reflection chromaticity (as a function of incidence angle in the range from zero to eighty degrees) for an SWP filter which reflects violet light. Curve T, which represents this SWP filter, follows a path that moves from purple to pink in color. Thus visible light reflected from the curve T filter is not substantially color invariant as the filter is "tilted" to cause the incidence angle to change from zero degrees to eighty degrees.

Curve U in FIG. 8 represents the reflection chromaticity of a modified version of the curve T filter in which the thickness of each H layer is simultaneously increased by five percent. Curve V in FIG. 8 represents the reflection chromaticity of a modified version the curve T filter in which the thickness of each H layer is simultaneously decreased by five percent. The designs represented by curves T and V are clearly inferior to the curve U design in the sense that they exhibit greater reflected color variation with incidence angle than does the curve T design. Curve U remains in the purple region, and thus represents an embodiment of the invention.

Figure 9:
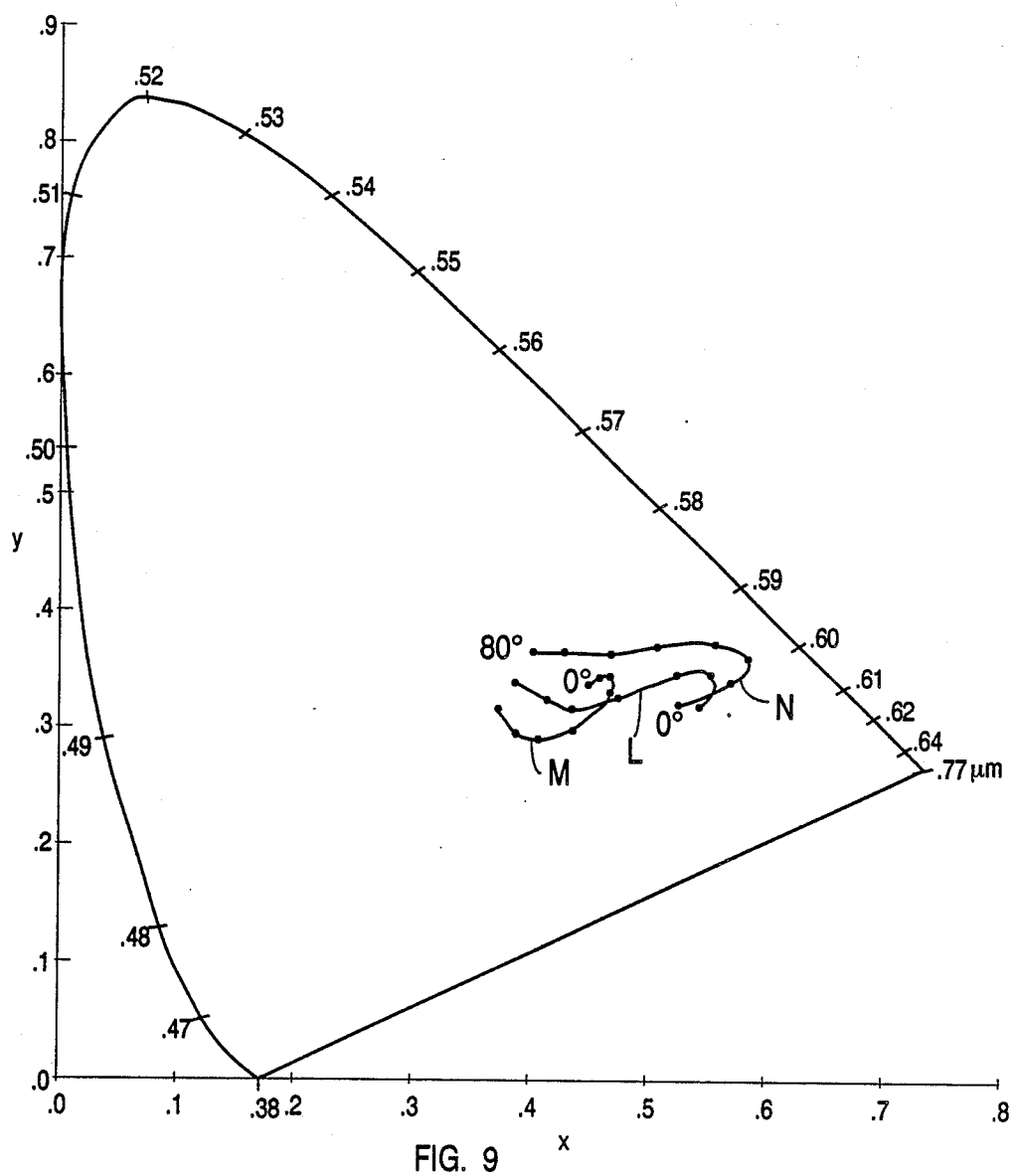
FIG. 9 is a reflection chromaticity plot showing the chromaticity of an inventive filter for reflecting orange light (and two variations on such filter), as a function of incidence angle over the range from zero to eighty degrees.

For another example, FIG. 9 is a C.I.E. 1931 Chromaticity diagram showing the reflection chromaticity (as a function of incidence angle in the range from zero to eighty degrees) for an SWP filter which reflects orange light. Curve L, which represents this SWP filter, is a path from an intense reddish-orange to a less intense orange. Thus visible light reflected from the curve L filter is not substantially color invariant as the filter is "tilted" to cause the incidence angle to change from zero degrees to eighty degrees.

Curve M in FIG. 9 represents the reflection chromaticity of a modified version of the curve L filter in which the thickness of each H layer is simultaneously increased by five percent. Curve N in FIG. 9 represents the reflection chromaticity of a modified version the curve L filter in which the thickness of each H layer is simultaneously decreased by five percent. The designs represented by curves L and N are clearly inferior to the curve M design in the sense that they exhibit greater reflected color variation with incidence angle than does the curve L design. Curve M remains in the orange region, and this represents an embodiment of the invention.

The design of each of the preferred embodiments of the invention is determined using an iterative optimization technique given the following constraints: the optical constants of the substrate and film materials are known; the desired reflectance spectrum is specified; then each layer thickness is found. To insure the filter is conveniently and repeatably manufactured, each layer's thickness must be within a specified tolerance of the optimum thickness. Therefore any small variations in each layer's thickness will not significantly alter the filter's reflectance curve. Preferably, the layer farthest from the substrate should be sufficiently thick so as to be scratch insensitive (in the sense defined above). Those of ordinary skill in the art will be familiar with, and capable of performing such an iterative optimization operation, as a matter of routine design. The operation will typically included the steps of choosing a merit function, and then minimizing the merit function utilizing an optimization routine, to determine the optimal set of design parameters. For example, U.S. Pat. No. 4,536,063, issued Aug. 20, 1985 to Southwell, (which patent is incorporated herein by reference), discusses the manner in which an optical coating design merit function may be chosen, and then minimized, to generate a desired optical coating design.

The inventive filter is preferably designed to be useful as a sunglass lens that will have a selected aesthetic appearance (in reflected light) to persons observing the wearer of the sunglasses. Where the inventive filters are to be used as sunglasses, the substrate glass should be selected to be absorptive of ultra-violet (UV) electromagnetic radiation and to be partially absorptive of the visible wavelength band.

The above description is merely illustrative of the invention. Various changes in the details of the materials, designs and methods described may be within the scope of the appended claims.

What is claimed is:

1. A short-wave-pass optical filter, including:
a substrate having a surface; and a coating supported by the surface of the substrate, said coating including a set of alternating layers formed of material having high refractive index and substantially quarter-wave optical thickness, and material having low refractive index and substantially quarter-wave optical thickness, where the thickness of each layer is selected so that the filter has a reflectance spectrum exhibiting a ripple over a first segment of the visible spectrum but exhibiting no significant ripple over a second segment of the visible spectrum, so that the reflectance of the first segment is sufficient to give the filter a desired aesthetic color, and so that the desired aesthetic color is substantially independent of incidence angle.

2. The filter of claim 1, wherein the substrate is composed of material that is capable of absorbing ultra-violet electromagnetic radiation.

3. The filter of claim 2, wherein the substrate is composed of material that is partially absorptive of visible electromagnetic radiation.

4. The filter of claim 1, wherein the thickness and refractive index of each layer is selected so that the filter reflects substantially all electromagnetic radiation having wavelength in the near-infrared range from 800 nanometers to 1100 nanometers.

5. The filter of claim 1, wherein the filter will reflect light having a blue appearance when white light is incident thereon.

6. The filter of claim 5, wherein said coating is a substantially double quarter wave stack coating including a first stack of alternating layers and a second stack of alternating layers, and wherein the optical thickness of each high refractive index layer in the first stack is simultaneously increased or decreased by a first percentage with respect to the correct optical thickness of the low refractive index layers in the first stack, and the optical thickness of each high refractive index layer in the second stack is simultaneously increased or decreased by a second percentage with respect to the correct optical thickness of the low refractive index layers in the second stack.

7. The filter of claim 1, wherein the filter will reflect light having a violet appearance when white light is incident thereon.

8. The filter of claim 1, wherein the filter will reflect light having an orange appearance when white light is incident thereon.

9. The filter of claim 1, wherein the reflectance spectrum also exhibits a ripple over a third segment of the visible spectrum, so that the reflections corresponding to both ripples combine to give the filter a desired aesthetic color.

10. The filter of claim 9, wherein the filter will reflect light having a blue appearance when white light is incident thereon.

11. The filter of claim 1, wherein reflectance spectrum also exhibits a partial second-order stopband over a third segment of the visible spectrum.

12. The filter of claim 1, wherein the substrate is composed of glass having refractive index substantially equal to 1.52 and capable of absorbing ultra-violet radiation, and the coating is composed of layers of $SiO_2$ having refractive index substantially equal to 1.44 alternating with layers of material having refractive index substantially equal to 2.25 selected from the class of materials consisting of $TiO_2$, $TiO$ and $Ti_2O_3$.

13. A short-wave-pass sunglass lens, including:

(a) a substrate that is absorptive of ultraviolet electromagnetic radiation and is partially absorptive of visible radiation, said substrate having a surface and a first refractive index; and (b) a coating on the substrate's surface including layers of material having high refractive index and substantially quarter-wave optical thickness alternating with layers of material having low refractive index and substantially quarter-wave optical thickness, the thickness of each of said layers being selected so that the lens has a reflectance spectrum with a ripple over a first segment in the visible range but has no significant ripple in a second segment in the visible range, so that reflected light having wavelength within the first segment is sufficient to give the filter a desired aesthetic color, and so that the desired aesthetic color is substantially independent of incidence angle.

14. The lens of claim 13, wherein the substrate is formed of glass having a refractive index substantially equal to 1.52, the layers having said high refractive index are formed of material selected from the class of materials consisting of $TiO_2$, $TiO$ and $Ti_2O_3$, and the layers having said low refractive index are formed of $SiO_2$.

15. The lens of claim 13, wherein the lens will reflect light having a blue appearance when white light is incident thereon.

16. The lens of claim 13, wherein the reflectance spectrum also has a ripple over the third segment in the visible range, so that the reflections corresponding to both ripples combine to give the filter a desired aesthetic color.

17. The lens of claim 16, wherein the lens will reflect light having a blue appearance when white light is incident thereon.

18. The lens of claim 13, wherein said coating is a substantially double quarter wave stack coating including a first stack of alternating layers and a second stack of alternating layers, wherein the optical thickness of each high refractive index layer in the first stack is simultaneously increased or decreased by a first percentage with respect to the correct optical thicknesses of the low refractive index layers in the first stack, and the optical thickness of each high refractive index layer in the second stack is simultaneously increased or decreased by a second percentage with respect to the correct optical thicknesses of the low refractive index layers in the second stack.

19. The lens of claim 13, wherein the lens will reflect light having a violet appearance when white light is incident thereon.

20. The lens of claim 13, wherein the lens will reflect light having an orange appearance when white light is incident thereon.

21. The lens of claim 13, wherein reflectance spectrum also exhibits a partial second-order stopband over a third segment of the visible spectrum.

22. A short-wave-pass optical filter, including:

(a) a substrate having a surface and a refractive index; and (b) a substantially double quarter-wave stack coated on the substrate's surface and capable of reflecting substantially all electromagnetic radiation in the near-infrared range, said stack including a number of alternating layers each characterized by a refractive index and an optical thickness, where each said refractive index and optical thickness is selected as a result of an iterative optimizing process so that the filter's reflectance spectrum has at least one rippled segment in the visible range and at least one non-rippled segment in the visible range, and so that the filter reflects a desired aesthetic color in a manner substantially independent of incidence angle.

23. The filter of claim 22, wherein the substrate is composed of material transparent to visible radiation.

24. The filter of claim 22, wherein the substrate is composed of material absorptive of ultra-violet radiation.

25. The filter of claim 22, wherein the substrate is composed of material partially absorptive of visible radiation.

26. The filter of claim 22, wherein the substantially double quarter-wave stack consists of layers of $SiO_2$ alternating with layers of material selected from the class of materials consisting of $TiO_2$, $TiO$ and $Ti_2O_3$.

27. A method for designing a short-wave-pass optical filter having a substrate and a coating supported by a surface of the substrate, said coating including a set of alternating layers formed of material having high refractive index and optical thickness substantially equal to a first quarter-wave optical thickness, and material having low refractive index and optical thickness substantially equal to a second quarter-wave optical thickness, including the steps of:
  (a) determining the thickness of each layer so as to cause the filter's reflectance spectrum to exhibit a ripple over at least a first segment of the visible spectrum but to exhibit no significant ripple over at least a second segment of the visible spectrum, and so as to cause the filter to reflect light having wavelength within each rippled segment to give the filter a desired aesthetic color when white light is incident thereon; and
  (b) simultaneously varying the percent thickness of each high refractive index layer relative to the correct thickness of the low refractive index layers, to determine an effective high refractive layer to low refractive layer thickness ratio which reduces the incidence angle dependence of the aesthetic color.

28. The method of claim 27, wherein the effective high refractive layer to low refractive layer thickness ratio is sufficient to cause the aesthetic color to be substantially independent of incidence angle.

29. The method of claim 27, wherein the thickness of each layer is determined so as to cause the filter to reflect light having wavelength within each rippled segment to give the filter a blue appearance when white light is incident thereon.

30. The method of claim 27, wherein the thickness of each layer is determined so as to cause the filter to reflect light having wavelength within each rippled segment to give the filter a violet appearance when white light is incident thereon.

31. The method of claim 27, wherein the thickness of each layer is determined so as to cause the filter to reflect light having wavelength within each rippled segment to give the filter an orange appearance when white light is incident thereon.

32. The method of claim 27, wherein the filter's reflectance spectrum determines a passband spanning the visible spectrum, and wherein the thickness of each layer is determined so as to cause the filter's reflectance spectrum to exhibit a partial second-order stopband within the passband.

33. The method of claim 32, wherein the effective high refractive layer to low refractive layer thickness ratio is sufficient to cause the aesthetic color to be substantially independent of incidence angle.

* * * * *